(No Model.)
B. F. JACOBS.
HOP SHOVEL.
No. 398,330. Patented Feb. 19, 1889.
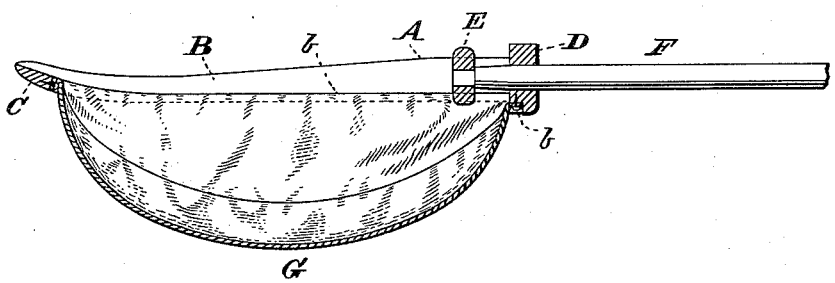
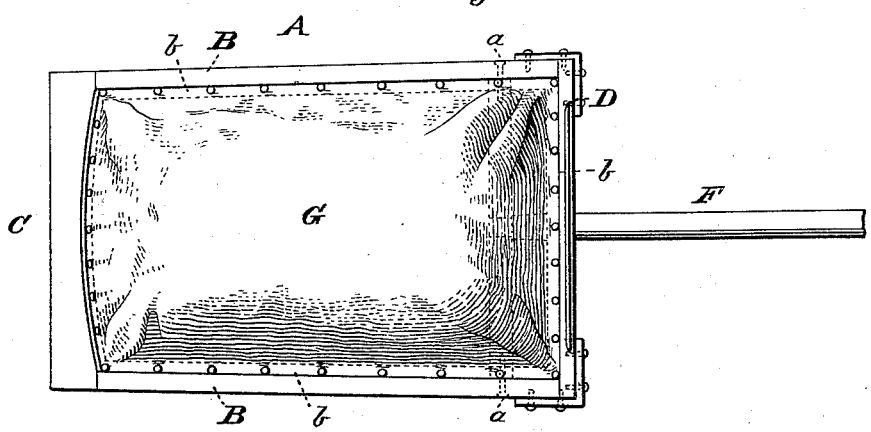
WITNESSES,
Villette Anderson.
C. R. Ferguson
INVENTOR.
Benjamin F. Jacobs
by E. W. Anderson,
Attorney.

UNITED STATES PATENT OFFICE.

BENJAMIN F. JACOBS, OF MILFORD, ASSIGNOR OF ONE-HALF TO MARCUS LUTHER, OF HARTWICK, NEW YORK.

HOP-SHOVEL.

SPECIFICATION forming part of Letters Patent No. 398,330, dated February 19, 1889.

Application filed June 19, 1888. Serial No. 277,542. (No model.)

*To all whom it may concern:*

Be it known that I, BENJAMIN F. JACOBS, a citizen of the United States, and a resident of Milford, in the county of Otsego and State of New York, have invented certain new and useful Improvements in Hop-Shovels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a longitudinal section. Fig. 2 is a bottom view.

The invention relates to improvements in hop-shovels; and it consists in the construction and novel combination of parts, as hereinafter set forth.

It has been the practice to remove the hops from the kiln by means of a rake, which is objectionable, for the reason that when the hops are first dried and yet warm they break up very easily and are very sensitive to the handling they receive. When raked off the kiln, they not only break, but lose their dust, which detracts materially from their marketable value. The object of my invention is to obviate this difficulty by providing a bag to hold the hops and the dust when it is desired to remove the hops from the kiln.

Referring to the drawings, A designates a light rectangular frame of wood or other suitable material, consisting of the sides B, having a slight upward curve toward the front, the thin or transversely-beveled front bar, C, the rear bar, D, and the bar E, having its ends secured to the side bars at $a$. The bar E serves as a brace to the main frame, and also receives the end of the handle F, which projects outwardly therefrom through an opening in the bar D. The lower inner edges of the side bars and the bar D are rabbeted, as at $b$, so that the nails or tack-heads securing the bag G thereon will not interfere with the movement of the shovel-frame on the floor.

The bag or hop receptacle G is preferably of a light close material, so that it will not add greatly to the weight of the shovel, and, owing to the close texture of the material, the dust will not sift through. The bag hangs downwardly in its central portion, and is designed to hold seven or eight pounds of hops.

Having described my invention, what I claim is—

1. In a hop-shovel, the combination, with the rectangular frame having the lower inner edges rabbeted, and the handle, of the bag, of light close material, having its edges secured within the rabbeted portion, substantially as specified.

2. A hop-shovel consisting of the frame composed of the sides having the upwardly-curved ends, the transversely-beveled front bar, the rear bar and the bar E, the bag secured to the lower side of the said frame, and the handle, substantially as specified.

In testimony whereof I affix my signature in presence of two witnesses.

BENJAMIN F. JACOBS.

Witnesses:
EUGENE LUTHER,
LYSCOM P. PERKINS.